T. J. & J. T. JONES.
Machines for Making Taper Tubes.
No. 141,932.  Patented August 19, 1873.
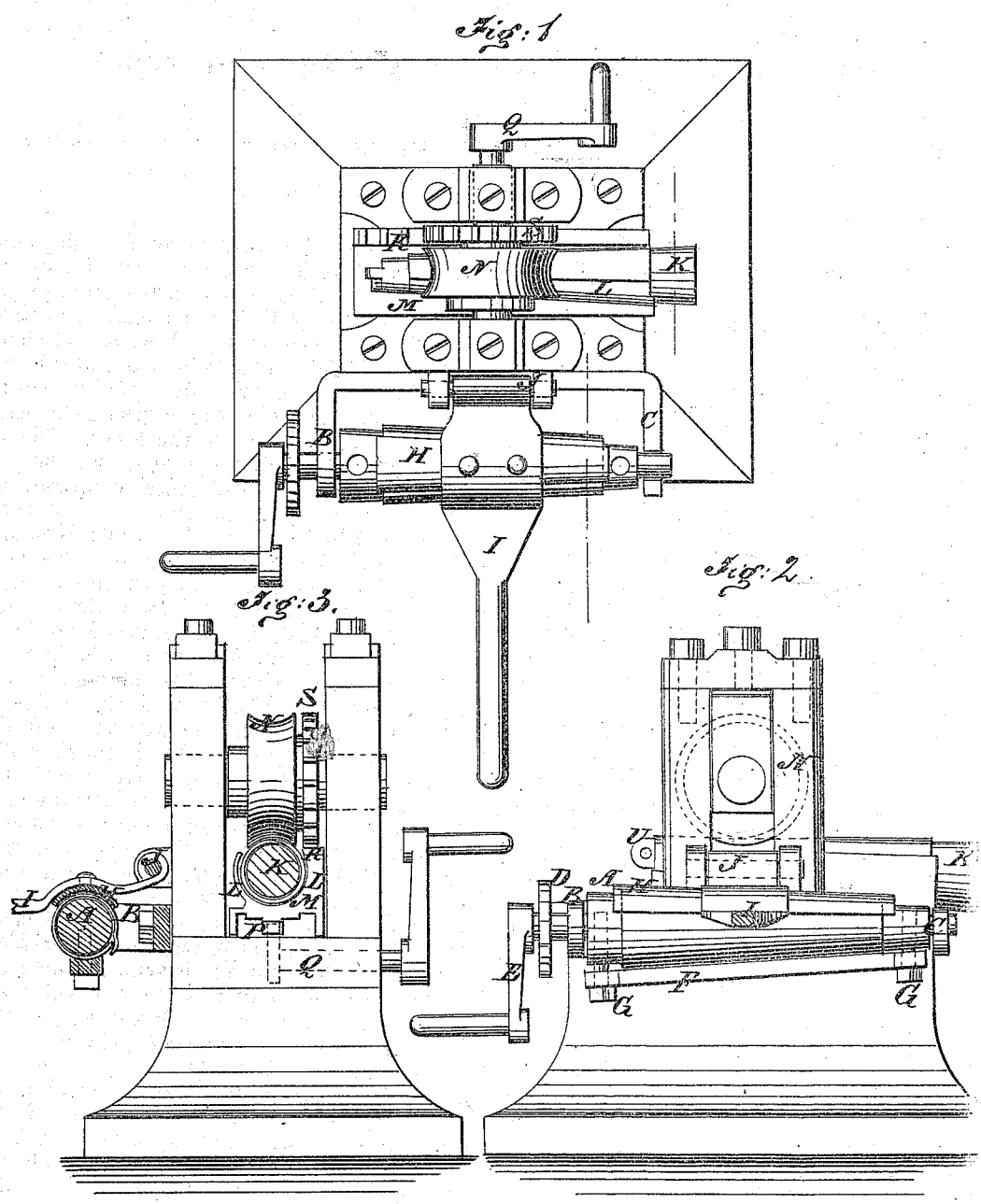
Witnesses:
Inventor:
T. J. Jones
J. T. Jones
Per
Attorneys.

UNITED STATES PATENT OFFICE.

THOMAS J. JONES AND JOHN T. JONES, OF SHARON, PENNSYLVANIA.

IMPROVEMENT IN MACHINES FOR MAKING TAPER TUBES.

Specification forming part of Letters Patent No. 141,932, dated August 19, 1873; application filed June 28, 1873.

*To all whom it may concern:*

Be it known that we, THOMAS J. JONES and JOHN T. JONES, of Sharon, in the county of Mercer and State of Pennsylvania, have invented a new and useful Improvement in the Manufacture of Tuyeres and Taper Tubes, of which the following is a specification:

Our invention consists of a taper mandrel, with a clamp for holding the plate of which the tube is to be formed at one edge, and a lever and bending-plate, so contrived that the tapered plate is bent to the form of the mandrel by pressing said bending-plate upon it by the lever, the mandrel being shifted around from time to time, and held stationary while the pressing is performed. Our invention also consists of a mandrel and holding-clamp, a welding-roller, and a carriage, so combined and arranged that the bent plate, being reheated and arranged on the mandrel with the edges lapped and adjusted in the carriage, is quickly and thoroughly welded by the pressure of the welding-roller, under which the lapped edges are caused to pass forward and backward until the joint is completed.

Figure 1 is a plan view of my improved machine. Fig. 2 is a side elevation with the lever of the bending-plate sectioned, and Fig. 3 is a sectional elevation taken on the line $x\ x$ of Fig. 1.

Similar letters of reference indicate corresponding parts.

A is the taper bending-mandrel. It is mounted in the brackets B C, so that said mandrel can be raised above them to slide the plate off from it after being bent. A ratchet-wheel, D, and pawl, or any equivalent means for holding the mandrel while bending the plate, will be used with said mandrel; also, a crank, E, for turning it. A clamping-plate, F, a little longer than the plates to be bent, is attached to the side of this mandrel, as shown, and secured detachably by bolts G. H is the bending-plate. It has a concave face, curved and tapered to correspond with the mandrel, and is as long as the plates to be bent, and arranged lengthwise of the mandrel, as shown. I is the bending-lever. It is hinged to the machine at J, and the bending-plate is attached to it so as to be pressed down on the top of the roller. The plate of which the tuyere or other taper tube is to be made, being previously cut in the taper form and size required and heated, is put on the mandrel under the clamp-bar F, with one edge projecting. The clamp is then screwed down so as to bend the portion of the plate which is under it and hold the plate securely; then the projecting edge of the plate is bent by pressing the bending-plate down on it by the lever. The remaining portion of the plate is then bent in the same manner by successive operations, beginning next to the clamping-bar and working around to the other edge, which is caused to lap over the edge first bent. The bent plate is then removed and put into a reverberatory furnace, to be reheated for welding the lapped edges. The apparatus for welding it consists of the tapered mandrel K, fixed tapered clamp or holder L, the carriage M, and welding-roller N, together with the necessary actuating devices for the carriage and the roller. The clamp or holder L consists of a longitudinal conical cavity or chamber in the carriage, open along the top, and arranged so that the bent plate with the mandrel in it, being introduced at the largest end, will wedge in tight, and be held with the lapped edges uppermost at the center of the opening at the top, and in a level plane. The roller N has a grooved face corresponding to the greatest diameter of the tube, and is arranged over the openings of the holder, so that it will press the lapped edges and weld the seam when they are moved along under it. To move the carriage with the bent plate to be welded it is geared by a toothed rack-bar, P, which gears with a crank-shaft, Q, by which power is applied. The carriage also has a toothed rack, R, which gears with the shaft of the welding-roller by a wheel, S, to cause the said roller to turn synchronously with the carriage.

In practice, we propose to have the welding apparatus and the furnace for reheating the plate so arranged relatively to each other that, the mandrel K being put into the bent plate while lying in the furnace, it may be drawn, by a chain or rod hooked onto the mandrel at U, directly into the holder, and thus readily and quickly secured for the welding process. After the tube is thus made it is removed from the holder, and the mandrel is removed from it, and the rings used to separate the outer shell of the tuyere from the inner one are welded in the ends, and the small tapered tube used to make a chamber for water is welded in the rings in the same way as in the manufacture of these tuyeres by hand.

Up to this time these tapered tuyere-tubes have been made by hand, the plates being bent with mallets over the horn of the anvil, and the edges being welded by hammers on a mandrel, three or four men being employed and five or six heats being taken. With our improved machine the work can be done better by one man, in less time, and with only two heats.

We may employ hammers in combination with the holder and welding-mandrel instead of the roller; and we do not, therefore, limit ourselves to the use of the roller.

Having thus described our invention, what we claim as new, and desire to secure by Letters Patent, is—

1. The combination of the bending-mandrel A, clamp F, the bending-lever I, bending-plate H, and a ratchet and pawl or other holding devices, substantially as specified.

2. The combination of the movable holder or clamp L, welding-mandrel K, welding-roller N, or its equivalent, and means for operating the carriage and roller, substantially as specified.

3. The combination, in a machine for bending and welding taper tubes, of the bending-mandrel A, lever I, and plate H with the bending-mandrel K, movable holder L, and welding-roller N, substantially as herein described.

THOMAS J. JONES.
JOHN T. JONES.

Witnesses:
ABNER APPLEGATE,
W. R. WOLFKILL.